(12) United States Patent
Cavaliere et al.

(10) Patent No.: US 10,116,389 B2
(45) Date of Patent: Oct. 30, 2018

(54) OPTICAL TRANSCEIVER

(71) Applicant: Telefonaktiebolaget LM Ericsson (publ), Stockholm (SE)

(72) Inventors: Fabio Cavaliere, Pisa (IT); Antonio Malacarne, Pisa (IT); Luca Giorgi, Pisa (IT); Luca Poti, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/317,462

(22) PCT Filed: Jun. 10, 2014

(86) PCT No.: PCT/EP2014/062050
§ 371 (c)(1),
(2) Date: Dec. 9, 2016

(87) PCT Pub. No.: WO2015/188855
PCT Pub. Date: Dec. 17, 2015

(65) Prior Publication Data
US 2017/0126319 A1    May 4, 2017

(51) Int. Cl.
*H04B 10/00* (2013.01)
*H04B 10/2575* (2013.01)
(Continued)

(52) U.S. Cl.
CPC ..... *H04B 10/2575* (2013.01); *H04B 10/2587* (2013.01); *H04B 10/40* (2013.01); *H04J 14/0216* (2013.01)

(58) Field of Classification Search
CPC .. H04B 10/2575; H04B 10/40; H04B 10/272; H04B 10/504; H04B 10/6932;
(Continued)

(56) References Cited

U.S. PATENT DOCUMENTS

| 7,522,847 B2* | 4/2009 | Momtaz | H04B 10/66 398/202 |
| 8,014,471 B2* | 9/2011 | Tonietto | G11B 20/10009 342/151 |

(Continued)

FOREIGN PATENT DOCUMENTS

| WO | WO 2011003481 | 1/2011 |
| WO | WO 2012034604 | 3/2012 |

OTHER PUBLICATIONS

Wavelength Data Rewriter for Centralized-Source Radio-Over-Fiber Access Networks. Gustavo Puerto, José Mora, Beatriz Ortega, Member, IEEE, and José Capmany, Senior Member, IEEE Photonics Technology Letters, vol. 22, No. 15, August 1, 2010.*

(Continued)

*Primary Examiner* — Hibret Woldekidan
(74) *Attorney, Agent, or Firm* — Sage Patent Group (57) ABSTRACT

A transceiver (4) comprising a receive part (70) configured to receive and detect a first signal carried on an optical carrier, wherein the signal is in a first part of a RF spectrum. The transceiver (4) further comprises a modulator (68) configured to modulate the same optical carrier with a second signal in a second part of the RF spectrum. The transceiver comprises a transmit part (60) configured to transmit the optical carrier modulated with the second signal. The first part of the RF spectrum is separate to the second part of the RF spectrum. The first signal and/or second signal are spectrally compressed signals.

22 Claims, 5 Drawing Sheets

(51) Int. Cl.
*H04B 10/2587* (2013.01)
*H04B 10/40* (2013.01)
*H04J 14/02* (2006.01)

(58) Field of Classification Search
CPC ............. H04B 10/697; H04B 10/505; H04B 10/6971; H04B 10/69; H04B 10/2507; H04J 14/0216; H04J 14/0282; H04J 2014/0253; H04J 14/0246; H04J 14/025; H04J 14/0232; H04J 14/0235; H04J 14/0298; H04J 7/00
USPC ... 398/115, 135, 66, 67, 70–72, 74, 76, 136, 398/183
See application file for complete search history.

(56) References Cited

U.S. PATENT DOCUMENTS

| | | | | |
|---|---|---|---|---|
| 8,483,570 B2* | 7/2013 | Sadot | ............... | H04B 10/541 398/140 |
| 8,879,927 B2* | 11/2014 | Proesel | ............... | H04B 10/6971 398/208 |
| 8,953,952 B2* | 2/2015 | Poesel | ............... | H04B 10/6971 398/208 |
| 9,426,000 B2* | 8/2016 | Gorshtein | ............... | H04B 10/2507 |
| 9,876,603 B2* | 1/2018 | Cavaliere | ............... | H04L 1/0006 |
| 10,056,980 B2* | 8/2018 | Cavaliere | ............... | H04B 10/5057 |
| 2005/0281563 A1* | 12/2005 | Li | ............... | H04B 10/40 398/195 |
| 2007/0183788 A1* | 8/2007 | Kim | ............... | H04J 14/0282 398/160 |
| 2009/0238568 A1* | 9/2009 | Lyubomirsky | ............... | H04B 10/5167 398/79 |
| 2011/0188859 A1* | 8/2011 | Wen | ............... | H04J 14/0282 398/79 |
| 2011/0274433 A1* | 11/2011 | Presi | ............... | H04B 10/25759 398/97 |
| 2012/0082466 A1* | 4/2012 | Wu | ............... | H04B 10/2575 398/183 |
| 2012/0321316 A1* | 12/2012 | Presi | ............... | H04B 10/2587 398/67 |
| 2014/0016938 A1* | 1/2014 | Sandstrom | ............... | H04B 10/506 398/72 |

OTHER PUBLICATIONS

A Full-Duplex Radio-Over-Fiber System Based on Optical Carrier Suppression and Reuse by Zhensheng Jia et al.; IEEE Photonics Technology Letters, vol. 18, No. 16—Aug. 15, 2006.
Modulation Format Transparent Subcarrier Reuse by Feed Forward Current Injection in a Reflective SOA by M. Presi et al. (JWA71. pdf); 2009 OSA/OFC/NFOEC—2009.
A Full-Duplex Radio-Over-Fiber System Using Direct Modulation Laser to Generate Optical Millimeter-Wave and Wavelength Reuse for Uplink Connection by Hong Wen et al.; Available online at www.sciencedirect.com; Optics Communications—Dec. 12, 2007.
International Search Report for International application No. PCT/EP2014/062050—dated Feb. 13, 2015.
A Novel Line Coding Pair for Fully Passive Long Reach WDM-PONs by M. Presi et al.; ECOC 2008, Sep. 21-25, 2008, Brussels, Belgium—2008 IEEE.
Integrated Tunable CMOS Laser for Si Photonics by Elton Marchena et al.; OFC/NFOEC Postdeadline Papers—2013 OSA.
Modeling and Analysis of Micro-Ring Based Silicon Photonic Interconnect for Embedded Systems by Moustafa Mohamed et al.; Codes+ISSS' 11, Taipei, Taiwan—Copyright 2011.
Novel WDM-PON Architecture Based on a Spectrally Efficient IM-FSK Scheme Using DMLs and RSOAs by Juan José Martinez et al.; Journal of Lightwave Technology, vol. 26, No. 3—Feb. 1, 2008.
Optical Filters Based on Ring Resonators With Integrated Semiconductor Optical Amplifiers in GaInAsP—InP by Dominik G. Rabus et al.; IEEE Journal of Selected Topics in Quantum Electronics, vol. 8, No. 6—Nov./Dec. 2002.
Overcoming the Challenges of Very High-Speed Optical Transmission by Fabio Cavaliere; Ericsson Review—Nov. 2013.
Ultra-Dense WDM Metro System; Source: Nokia Siemens Networks GmbH & Co. KG; Study Group 15—Contribution 2323; International Telecommunication Union; Telecommunication Standardization Sector, Study Period 2009-2012; COM 15—C 2323—E—Nov. 2016.
Mazo JE: "Faster-than-nyquist signaling", Bell System Technical Journal, AT and T, Short Hills, NY, US, vol. 54, No. 8, Oct. 1, 1975 (Oct. 1, 1975), pp. 1451-1462, XP011631499.
ISSN: 0005-8580, DOI: 10.1002/J.1538-7305.1975.TB02043.X.
EP Office Action—EP 14730829.0—dated Mar. 7, 2018—pp. 6.

* cited by examiner

OPTICAL TRANSCEIVER

PRIORITY

This nonprovisional application is a U.S. National Stage Filing under 35 U.S.C. § 371 of International Patent Application Serial No. PCT/EP2014/062050, filed Jun. 10, 2014, and entitled "Optical Transceiver."

TECHNICAL FIELD

Aspects relate to an optical transceiver and a method in an optical transceiver. Examples of the invention relate to an upstream optical transceiver (OLT) and a downstream optical transceiver (ONT).

BACKGROUND

Optical networks are used for the metro-access networks, approximately corresponding to distances lower than 100 km. Current research is in the introduction of colorless DWDM optical interfaces and transmission techniques. For example, WO2012/034604 describes self-seeding, as an example of a modulation format recently proposed for this purpose. A further example, using wavelength reuse, is described in M. Presi, R. Proietti, K. Prince, G. Contestabile, E. Ciaramella: "A Novel Line Coding Pair for Fully Passive Long Reach WDM-PONs", ECOC 2008, 21-25 Sep. 2008, Brussels, Belgium Th.1.F.1. These solutions may have performance limitations, for example due to optical reflections or relative intensity noise.

A further system using Ultra Dense Wavelength Division Multiplexing (UDWDM) has a high cost, for example, as described in Nokia Siemens Networks: Ultra-dense WDM metro system, C2323, ITU-T Q6/15 meeting in Geneva, September 2012.

Long link distance and attenuation in metro access systems can be achieved with tunable lasers or coherent optical interfaces, for example, as described in Elton Marchena et al: Integrated Tunable CMOS Laser for Si Photonics, PDP5C.7.pdf OFC/NFOEC Postdeadline Papers© 2013 OSA. The cost issue is significant, particular for coherent interfaces, which need tunable lasers at transmitter and receiver and use a complicated receiver structure to couple the light of received signal and local oscillator.

SUMMARY

A first aspect of the present invention provides a transceiver comprising a receive part configured to receive and detect a first signal carried on an optical carrier, wherein the signal is in a first part of a RF spectrum. The transceiver comprises a modulator configured to modulate the same optical carrier with a second signal in a second part of the RF spectrum. The transceiver comprises a transmit part configured to transmit the optical carrier modulated with the second signal. The first part of the RF spectrum is separate to the second part of the RF spectrum. The first signal and/or second signal is a spectrally compressed binary signal.

Thus, the transceiver provides for a reflection-tolerant, spectrally efficient optical transmission.

Optionally, the spectrally compressed first and/or second signal has a bandwidth below a Nyquist frequency.

Optionally, the spectrally compressed first and/or second signal comprises a maximum frequency of the higher frequency of the first and second signals which is equal or lower than its bit rate.

Optionally, the transceiver is configured to transmit the second signal with inter-symbol interference.

A second aspect of the present invention provides a transceiver comprising a transmit part configured to transmit a first signal carried on an optical carrier, wherein the signal is in a first part of a RF spectrum. The transceiver comprises a receive part configured to receive and detect a second signal carried on the same optical carrier in a second part of the RF spectrum. The first part of the RF spectrum is separate to the second part of the RF spectrum. The first signal and/or second signal is a spectrally compressed binary signal.

A third aspect of the present invention provides a transceiver comprises receiving and detecting a first signal carried on an optical carrier, wherein the signal is in a first part of a RF spectrum. The method further comprises modulating the same optical carrier with a second signal in a second part of the RF spectrum, and transmitting the optical carrier modulated with the second signal. The first part of the RF spectrum is separate to the second part of the RF spectrum. The first signal and/or second signal is a spectrally compressed binary signal.

A fourth aspect of the present invention provides a method in a transceiver, comprising transmitting a first signal carried on an optical carrier, wherein the signal is in a first part of a RF spectrum. The method further comprises receiving and detecting a second signal carried on the same optical carrier in a second part of the RF spectrum. The first part of the RF spectrum is separate to the second part of the RF spectrum. The first signal and/or second signal is a spectrally compressed binary signal.

A fifth aspect of the present invention provides a system comprising a first transceiver and a second transceiver. The first transceiver is a transceiver as claimed in any example. The second transceiver is a further transceiver as claimed in any example.

BRIEF DESCRIPTION OF THE DRAWINGS

Embodiments of the present invention will now be described, by way of example only, with reference to the accompanying drawings in which.

DETAILED DESCRIPTION

Aspects of the invention are applicable to metro, access, front-haul or backhaul systems. Aspects of the invention use SCM techniques to split downlink and uplink spectra. In some examples, the downstream modulated signal is upshifted in the radio frequency domain so that its spectrum lies entirely above a threshold frequency. The downstream signal above the threshold frequency is removed by filtering at a downstream terminal, for example, by a three port filter.

In addition, the upstream modulated signal is in a separate part of the RF spectrum, e.g. below the threshold frequency. This arrangement allows use of low cost components, and provides for improved performance.

Figure 1:
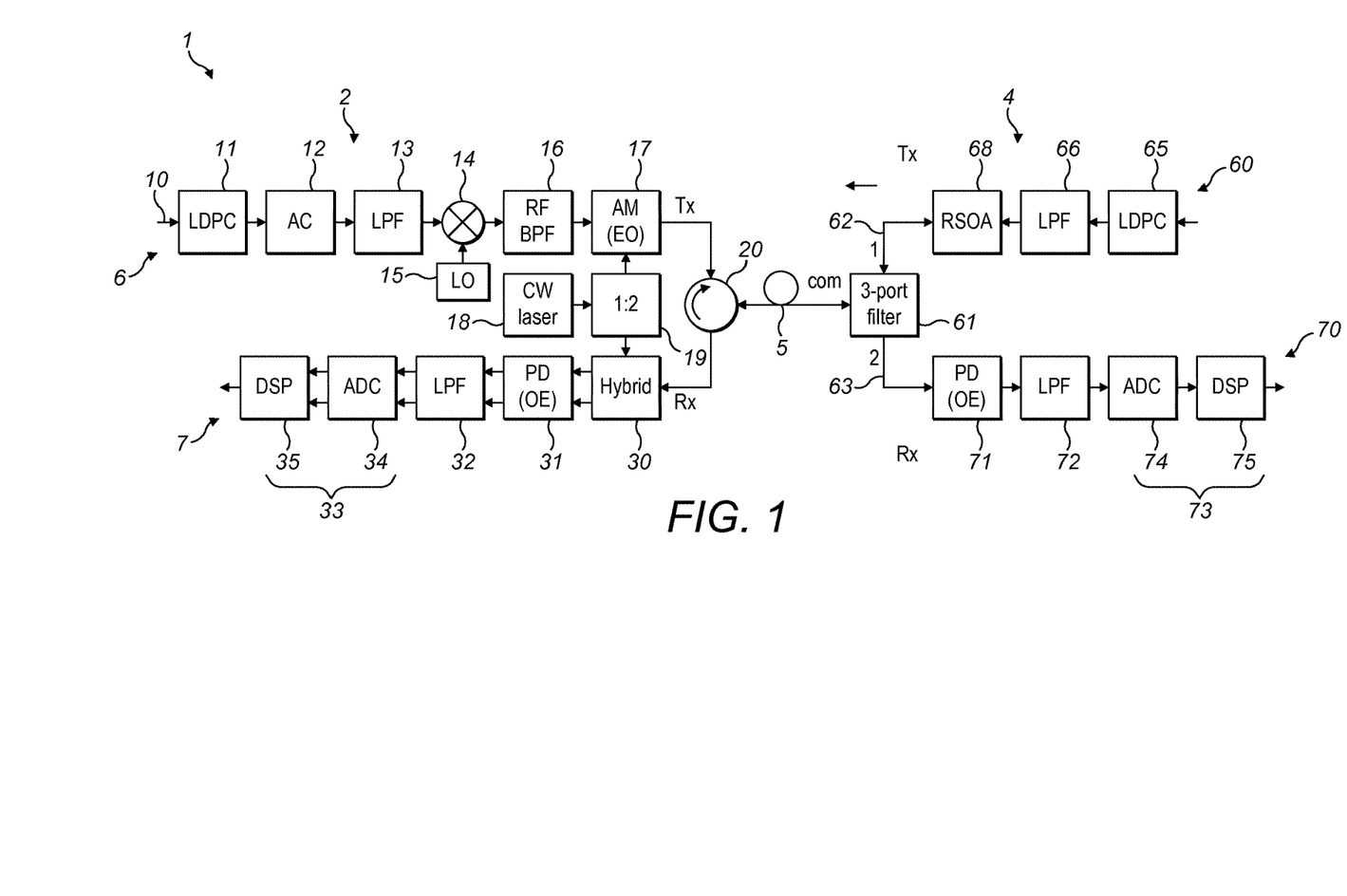
FIG. 1 shows an example of a transceiver system according to an example of the invention.

FIG. 1 shows an example system 1 according to an example of the invention. The system 1 comprises an Optical Line Terminal (OLT) transceiver 2 an Optical Network Terminal (ONT) transceivers 4. The system 1 may comprise one or more ONT transceiver 4 may be connected to an OLT transceiver 2. The OLT transceiver 2 and ONT transceiver 4 are connected by an optical connection 5, e.g. an optical fiber. Examples of the invention may be defined independently for the ONT transceiver 4 and OLT transceiver 2.

The OLT transceiver 2 comprises a transmit part 6, including those components configured to provide for transmission of the modulated optical signal. The transmit part is configured to send a first, downstream, signal to the ONT. The OLT transceiver 2 further comprises a receive part 7, including those components configured to provide for receiving a modulated optical signal. The receive part 7 is configured to receive a second, upstream, signal from the ONT. One or more components may be shared between the transmit part 6 and receive part 7.

The transmit part 6 will now be described. The OLT transceiver 2 comprises an input 10 configured to receive an incoming signal, for example, modulated with on-off keying (OOK). The input 10 is configured to receive the signal from an external source, or another part of the OLT transceiver 2. In some examples, the input 10 is unipolar. An example bit rate is 10 Gbit/s.

The OLT transceiver 2 further comprises an encoder 11, for example an encoder for applying an error correcting code. In some examples, the error correcting code is a forward error correcting (FEC) code. In some examples, the error correcting code is a Low Density Parity Check (LDPC) encoder 11, configured to receive the signal from input 10. The LDPC encoder 11 is configured to LDPC encode the signal. An effect of the encoding is described below.

In some examples, the OLT transceiver 2 further comprises an adapter 12. The adapter 12 is configured to convert the modulation format. For example, the modulation format is converted to a bipolar format, e.g. a phase shift keyed signal. The adapter 12 may use AC coupling. The output of the adapter 12 is a binary signal. In some examples, the adapter provides a bipolar signal. For example, the adapter uses AC coupling to convert the signal to a phase shift keyed signal, e.g. at 10 Gbit/s. For example, the signal is converted to a binary phase shift keyed signal (BPSK).

The OLT transceiver comprises a first filter 13. The first filter 13 is configured to pass the signal with a defined passband. In some examples, the filter 13 has a passband lower than the Nyquist frequency of the data.

The first filter 13 is a low pass filter. The passed signal is a baseband signal. In this example, the first filter 13 passes frequencies below 3 GHz for a 10 Gbit/s signal. In some examples, the signal is narrow-filtered with a cut-off frequency which can be lower than the Nyquist frequency, i.e. half of the bit rate. The cut-off frequency may be determined by the spectral compression (i.e. frequency packing) scheme.

In some examples, the first signal is spectrally compressed. One or more spectral compression techniques, e.g. frequency packing, are used to increase the spectral efficiency. For example, the spectral efficiency is increased from 3 to 4 bit/s/Hz. For example 10 Gbit/s is transmitted in a 3-GHz bandwidth.

The compressed signal spectrum has a bandwidth below a Nyquist frequency. The signal is narrow filtered, i.e. filtered more narrowly than (i.e. below) the Nyquist frequency.

The spectral compression is introduced by a combination of the encoding (by encoder 11) and the filtering (by filter 13). The encoder 11 and filter 13 provide a signal which has a bandwidth lower than the Nyquist frequency. This provides for a spectrally compressed binary signal to be generated. Alternatively, the spectral compression may be considered as introduced by the encoder only.

In some examples, the spectrally compressed signal overlaps in time. In this case, the signal comprises a non-orthogonal transmission. For example, the transmission involves sending time overlapping pulse trains. This compression or packing of the signal introduces inter-symbol interference. In some examples, the symbols overlap in time. The transceiver intentionally introduces the inter-symbol, i.e. in order to reduce the bandwidth of the transmitted signal.

In some examples, the first or second signal comprises a maximum frequency of the higher frequency of the first and second signals which is equal or lower than its bit rate. A maximum frequency, i.e. highest radio frequency, occupied by the higher of the first or second signals has a value (expressed in Hz). This value is equal or lower than the value of the bit rate of the higher of the first or second signals (expressed in bit/s). For example, the modulation is a binary modulation format. In this example, the first signal has the higher frequency band. The maximum frequency refers to the highest frequency used by the first signal.

In some aspects, the bandwidth occupied by the combined first and signals is less than or equal to the total bit rate of the first and second signals divided by two.

As will be explained, a receiver part of the OLT and/or ONT comprises a decoder configured to recover the inter-symbol interference. For example, a maximum a posteriori (MAP) decoder iteratively interacts with a LDPC decoder at the receiver, to recover the inter-symbol interference.

Alternatively or in addition, the signal is time packed. In this case, the transmission involves frequency overlapping.

The frequency packing is arranged to reduce the bandwidth of the signals, e.g. both downstream and upstream signal. This allows the bandwidth of both upstream and downstream signals to be within the bandwidth of conventional and cost effective transmitter and receiver components, e.g. 10G components. This spectral compression allows use of low order modulation formats, e.g. binary modulation formats, whilst maintaining the upstream and downstream signals within a relatively small (and separate) RF bandwidth.

The signal is then upshifted in frequency by a mixer 14. The mixer 14 is configured to upshift the signal such that the signal spectrum is entirely above the cut-off frequency of a transmission part of the ONT transceiver 4 (described below). As such, the upshifted downstream signal does not interfere with an upstream signal from the transmission part of the ONT transceiver 4. The upshift is by a RF frequency. In this case, the upshift is 7 GHz.

The upshift is of the same order of magnitude as the bandwidth of the signal. The upshifting of the signal is carried out by mixing with a local oscillator frequency from a local oscillator 15. The local oscillator frequency is a RF frequency, e.g. at 7 GHz. In some examples, the upstream signal and downstream signal may be considered as subcarriers separated by a radio frequency (i.e. SCM).

For example, the upshifted signal spectrum is within the bandwidth of a conventional binary (e.g. OOK) modulated signal at the same bit rate. For example, the spectral compression allows the signal to have a lower bandwidth than a conventional binary modulated signal. This allows the upstream and downstream signal to occupy a total bandwidth equal to, or less, than twice the Nyquist frequency. This allows the transceivers to use relatively low cost components, e.g. 10 G electronics. For example, the same transceiver may be used for conventional 10 Gbit/s transceivers.

In some examples, the signal from the OLT transceiver is arranged to occupy only a part of the RF spectrum. In this case, the part occupied is separated from the baseband frequency. The spectrum adjacent to the baseband frequency does not contain a data signal from the OLT transceiver 4. As such, there is no downstream data signal in this part of the spectrum. The upshifted signal has a bandwidth less than that of a conventional OOK modulated signal at the same bit rate.

In some examples, the modulation format of the upstream and/or downstream signal is a low order modulation format. For example, the modulation format is a binary format, e.g. OOK or BPSK.

Higher order modulation formats (e.g. 16 QAM) suffer a penalty due to the amplification noise and non-linear distortion caused by the modulator response, the receiver response and the optical fiber. In addition, such higher order modulation formats are complex to implement.

Binary signals (binary modulation format signals), e.g. BSPK, are relatively tolerant of noise. For example, the binary signals are tolerant of a relatively low signal-to-noise ratio. The binary signals are simple to generate. The binary signals are simple to detect. Thus, the selection of binary modulation format signals provides for a tolerant and low cost system.

In some examples, a second filter 16 is arranged to receive the upshifted signal from the mixer 14. The second filter 16 is configured to remove any undesired frequency generated by the mixer 14, e.g. if the mixer is a highly nonlinear device. The second filter 16 may be a band pass filter (BPF). The second filter 16 operates at radio frequencies.

The upshifted modulated signal is sent to an amplitude optical modulator 17. The modulator 17 is arranged to receive the radio frequency, filtered below the Nyquist frequency (frequency packed), bipolar (BPSK) signal, e.g. at 10 Gbit/s. In some examples, the optical modulator modulates an optical signal from a laser 18, e.g. a continuous wave laser. In this examples, the output from the laser 18 is split (e.g. equally) by a splitter 19 between a transmission part of the OLT transceiver (i.e. to the modulator 17) and a receive part (described below).

The amplitude optical modulator 17 is, for example, an Electro Absorption Modulator (EAM), a Mach Zehnder Modulator (MZM) or an In-phase Quadrature (IQ) modulator. The IQ modulator provides a single side band signal, which doubles the spectral efficiency. In some examples the modulator 17 uses a low modulation index. This allows use of simple direct detection to be used at the ONT receiver, as in conventional SCM receivers.

Figure 2A:
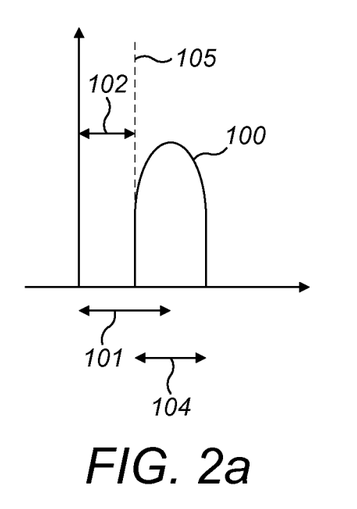
FIG. 2a shows an example of a first spectrum according to an example of the invention.

FIG. 2a illustrates an example radio frequency spectrum of a first signal 100 output from the transmission part of the OLT 2 on the optical carrier. The signal 100 has been upshifted by a radio frequency shift 101, e.g. in the mixer 14. The first signal 100 is present only in a first part 104 of the RF spectrum. The OLT 2 is arranged such that there is a portion of unused frequency spectrum 102, which is not occupied by the downstream signal 100. For example, the RF spectrum of the first signal is entirely above a threshold frequency 105, allowing use of the RF spectrum below the threshold frequency 105 by the upstream signal.

The frequency distance 102 between the optical carrier and the lowest frequency of the subcarrier 100 is equal or higher than the cut-off frequency of the transmit part of the second transceiver, i.e. ONT 4.

From the modulator 17, the downstream optical signal is transmitted into the optical fiber 5 through an optical circulator 20.

The ONT 4 is now described. The ONT transceiver 4 comprises a transmit part 60, including those components configured to provide for transmission of a modulated optical signal. The OLT transceiver 2 further comprises a receive part 70, including those components configured to provide for receiving the modulated optical signal from the OLT. One or more components may be shared between the transmit part 60 and receive part 70.

The ONT 4 is configured to receive the RF modulated optical signal from the OLT 2. The ONT 4 is configured to split the received signal, such that both the receive part 70 and the transmit part 60 of the ONT 4 receives at least part of the signal. The receive part 70 is arranged to receive the optical signal with the RF modulation, which is processed as described below.

The transmission part 60 is arranged to receive the optical carrier, with a removed or significantly reduced downstream RF signal, or to filter the received signal to remove or significantly reduce the downstream RF signal. In particular, the RF signal 100 within a particular passband, e.g. above the threshold frequency 105, is removed or reduced. The downstream optical carrier is reused for upstream transmission. If the downstream data is not filtered out, the downstream data may interfere with the upstream data, causing a transmission penalty.

At the ONT, a 3-port filter 61 splits the incoming downstream signal between the receive part 70 (downstream receiver) and transmit part 60 (upstream transmitter). The three port filter 61 is bidirectional. The carrier is output to the transmit part 60 and the first signal is output to the receive part 70. In some examples, the three port filter is configured to drop a downlink optical carrier on a first port 62 connected to the transmit part 60, and a downlink modulating signal on a second port 63 connected to the receive part 70. The 3 port filter 61 may be considered as part of the transmit part 60 and receive part 70. In some examples, the three port filter is configured to isolate the optical carrier from the first signal.

In some examples, the receiver part of the ONT is a self-homodyne receiver. The receiver is a coherent homodyne receiver using the transmitted optical carrier as local oscillator.

The receive part 70 of the ONT 4 is now described. The downstream modulating signal extracted at the second port 63 of the three port filter 61 is photodetected at a photodetector 71, e.g. a photodiode. In some examples, the detection is direct detection.

In some examples, the detected signal is filtered, e.g. by low pass filter 72, to remove components not related to the signal data.

The detected signal is then processed in the electrical domain by the receive part 70. For example, a processing unit 73 is configured to sample the signal in an analogue-to-digital converter (ADC) 74 so that it can be digitally processed to recover the original 10 Gbit/s signal. In some examples, the processing unit comprises a digital signal processor 75 to digitally process the electrical signal, and recover the original data. For example, the processing unit comprises a maximum a posteriori (MAP) decoder which is configured to iteratively interact with a LDPC decoder at the receiver, to recover the inter-symbol interference.

The downstream modulated signal 100 (frequency packed, modulated) is upshifted in the radio frequency domain so that its spectrum lies entirely above the cut-off frequency of the 3-port filter 61 (first port 62) at the ONT input. The optical carrier output to the transmit part 60 is not modulated with the first signal. This allows the unmodulated downstream carrier to be used again for upstream modulation. In some examples, the optical carrier is used for base band upstream modulation at the ONT without any further cancellation techniques to remove the downstream modulating signal. This is the function of the transmit part 60.

At the first port 62 of the three port filter 61, the downstream modulating signal 100 is cancelled by the filter 61. This allows the residual unmodulated optical carrier to be ready to be amplitude modulated by upstream data. The filtering out of the first signal from the ONT is such that the first signal is substantially removed or is reduced in amplitude.

In some examples, the upstream data is unipolar. An example bit rate is 10 Gbit/s. In some examples, the upstream data is received by an encoder 65 configured to encode the data, for example by LDPC encoding. The encoder 65 may have any function or property of the encoder 11 of the OLT. In particular, the encoder 65 may provide for spectral compression, e.g. by providing inter-symbol interference.

The encoded data is passed to a filter 66, for example, a low pass filter. This narrow-filtering is according to the spectral compression scheme.

In some examples, the filter 66 has a passband lower than the Nyquist frequency. The filter 66 filters the signal below the Nyquist frequency. The upstream signal is spectrally compressed, e.g. frequency packed. As for the downstream signal, the upstream signal is a non-orthogonal transmission. In some examples, the second signal is generated to include inter-symbol interference. As such, the second signal comprises inter-symbol interference (i.e. symbol overlap) on transmission.

In some examples, the spectral compression is introduced by a combination of the encoding (e.g. by encoder 65) and the filtering (e.g. by filter 66). The encoder 65 and filter 66 provide a signal which has a bandwidth lower than the Nyquist frequency. This provides for a spectrally compressed binary signal to be generated.

The transmit part 70 of the ONT 4 comprises a modulator 68, for example, a Reflective Semiconductor Optical Amplifier (RSOA). The RSOA 68 is configured to receive the upstream data signal. The RSOA receives the upstream data, e.g. from the filter 66. The RSOA 68 also receives the downstream optical carrier signal. The modulator 68 is configured to modulate the downstream optical carrier signal with the second RF signal containing upstream data. In some examples, the modulator 68 is configured to directly modulate the second signal. The optical carrier is reflected by the modulator 68, the reflected optical carrier modulated to contain the upstream second signal.

In some examples, the RSOA has two electrical inputs, an input for the modulation and a further input for the DC bias. The DC bias input is not shown.

In some examples, the downstream first modulating signal is removed prior to the receiving by the RSOA 68. In some examples, the modulating device functions as a low pass filter, to remove or reduce the first RF signal from the downstream carrier.

In some examples, the 3-port filter 61 at the ONT is based on optical ring resonators, optionally integrated with the ONT transceiver. This provides a low cost implementation. Implementation may utilize silicon photonics with hybrid integration techniques or a monolithic InP implementation. The system is colorless on a given frequency grid (e.g. the 100 GHz ITU-T grid) and may be thermally tuned on the desired frequency.

The upstream data is in a different (i.e. separate) part of the RF spectrum than the downstream data. For example, the upstream data is a baseband signal. The upstream signal is not upshifted by a RF frequency, e.g. by mixing with a RF frequency, as carried out in the OLT 2. In some examples, the upstream second signal is spectrally compressed. The second signal has a bandwidth below a Nyquist frequency.

In some examples, the upstream data is modulated in a binary modulation format, e.g. OOK. In some example, the highest frequency of the upstream second signal is lower than the lowest frequency of the subcarrier of the first signal, i.e. transmitted by the OLT.

The bandwidth of the second signal is lower or equal to that of a conventional OOK signal. This allows the second signal in order to stay within the RSOA modulation bandwidth. Binary signals (BPSK in downstream and OOK in upstream) are used to simplify signal generation and detection at both OLT and ONT.

In some examples, the RSOA 68 has a radio frequency port with a low-pass frequency response. The radio frequency port has a cut-off frequency, e.g. of about 3 GHz. The RSOA has a low pass filtering response (e.g. 3 GHz) at its electrical input. This cut-off provides that the spectrum of the upstream signal lies entirely below a threshold frequency, e.g. 3 GHz. In some aspects, the frequency response of the RSOA is below the cut-off frequency of port (port 1) of the three port filter connected to the transmit part. The downstream first signal has substantially no radio frequency components which are output to the transmit part 60 (i.e. to port 1) of the ONT.

This guarantees no cross-talk due to optical reflections occurs when downstream and upstream signals propagate in opposite directions along the same fiber.

In some examples, the downstream RF data signal is removed prior to reaching the RSOA. For example, the downstream RF data signal is removed prior to the transmission part of the ONT transceiver, e.g. by the three port filter.

The ONT 4 then transmits the upstream data signal, modulated on the reflected optical carrier, which originated at the OLT, back to the OLT. The optical carrier modulated with the second signal is transmitted through the three port filter 61. In some examples, a center frequency of the first signal and the second signal are separated by a RF frequency.

Figure 2B:
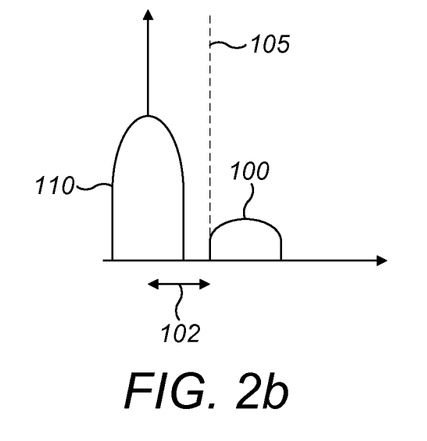
FIG. 2b shows an example of a second spectrum according to an example of the invention.

FIG. 2b illustrates an example radio frequency spectrum of a second signal 110 output from the transmit part 60 of the ONT 4, on the same optical carrier as the first signal 100. The signal 110 has not been upshifted by a radio frequency shift, and is at base band. The ONT 4 is arranged such that the second signal 11 occupies the portion of unused frequency spectrum 102, which is not occupied by the downstream first signal 100. For example, RF spectrum below a threshold frequency 105 is used by the upstream second signal 110. In some examples, there is a guard band between the first and second signals. In some examples, the upstream and downstream signals are considered to be SCM subcarriers.

In some examples, one or more downstream subcarrier 100 is in a separate part of the RF spectrum to one or more upstream subcarriers 110. Each of the upstream and downstream signals 110,110 occupies a continuous block of spectrum.

Referring again to FIG. 1, the receive part of the OLT 2 is now described. At the OLT 2, the circulator 20 distributes the received upstream signal to the receive part 7. The upstream optical signal is mixed with the downstream unmodulated optical carrier in a 90° hybrid device 30. The hybrid device 30 splits and recombines received signal 110 and optical carrier in two linear orthogonal polarization states. The two outputs of the hybrid device 30, corresponding to the two polarization states, are separately detected and digitally processed. The hybrid device 30 receives an input from the laser 18, also used for transmission.

For example, each upstream modulating signal is photodetected at a photodetector 31, e.g. a photodiode.

In some examples, the detected signal is filtered, e.g. by low pass filter 32, to remove components not related to the signal data.

The detected signal is then processed in the electrical domain in the receive part. For example, a processing unit 33 is configured to sample the signal in an analogue-to-digital converter (ADC) 34 so that it can be digitally processed to recover the original, e.g. 10 Gbit/s signal. In some examples, the processing unit comprises a digital signal processor 35 to digitally process the electrical signal, and recover the original data.

For example, the detection (e.g. photo-detecting, low-pass filtering, sampling and digital processing) is according to a self-homodyne detection method.

In some aspects, the system is a WDM system. The different wavelengths are independent so that a wavelength channel, modulated as described in the invention, may coexist with conventional (e.g. OOK) channels, or other channels modulated as described, at different wavelengths.

Figure 3:
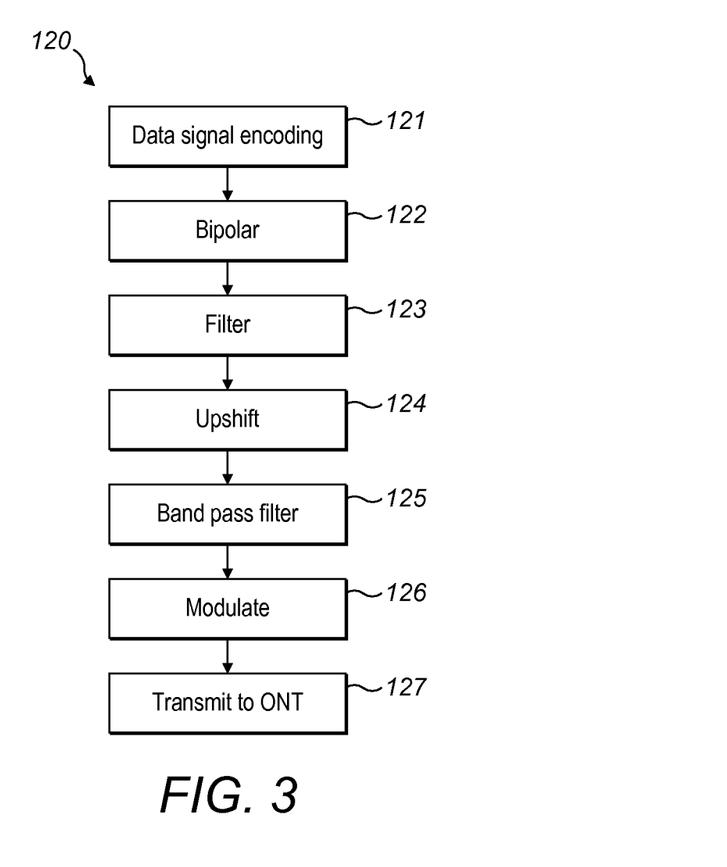
FIG. 3 shows a flowchart illustrating steps according to an example of a part of the invention.

FIG. 3 illustrates an example method 120 at the OLT according to one or more aspects of the invention. The method shown includes transmitting steps at the OLT. Aspects of the invention may relate to any subset of these steps.

In 121, a data signal is encoded, e.g. LDPC encoded. In 122, the signal is converted into a bipolar signal. In 123, the signal is low pass filtered. As described, the filter bandwidth may be less than a Nyquist frequency.

The encoding and filtering provides a spectrally compressed signal. The signal is a non-orthogonal signal. The transceiver is configured to introduce inter-symbol interference in the first signal and/or second signal as transmitted. This reduces the bandwidth occupied by the data, allowing both upstream and downstream signals to be contained within a relatively small RF bandwidth.

In 124, the signal is mixed with a radio frequency signal. This upshifts the signal by the mixed radio frequency from the local oscillator. This upshifted signal is termed the first signal. In 125, the first signal is band pass filtered. This ensures that the RF spectrum with a frequency lower than a threshold is filtered out, i.e. substantially does not contain the first signal.

In 126, the first signal modulates a laser optical carrier, e.g. amplitude modulates the laser carrier. In 127, the optical carrier modulated by the first signal is transmitted to the ONT. The transmission is through the optical circulator. The signal transmitted is a spectrally compressed binary signal.

Figure 4:
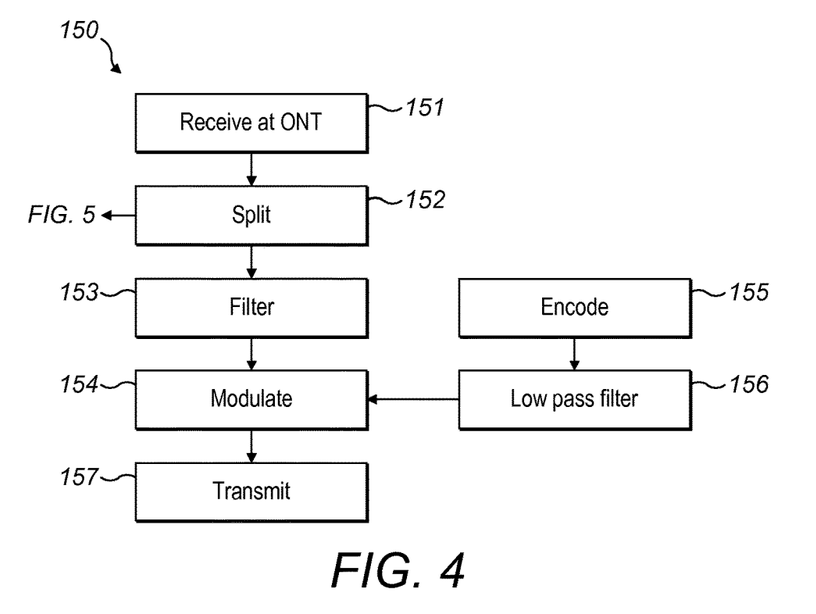
FIG. 4 shows a flowchart illustrating steps according to an example of a part of the invention.

FIG. 4 illustrates an example method 150 at the ONT according to one or more aspects of the invention. The method shown includes transmitting steps at the OLT. Aspects of the invention may relate to any subset of these steps.

In 151, the optical carrier modulated by the first signal is received at the ONT. The first signal is in a predetermined first part of the RF spectrum. In some examples, the first part of the RF spectrum is spaced away from the baseband. As such, the first part of the RF spectrum is above a non-zero predetermined threshold.

In 152, the received optical carrier modulated by the first signal is split. The first signal is output to a receive part of the ONT, and the received optical is output to a transmit part of the ONT. In some examples, the splitting or dividing is by the three port filter.

In 153, the transceiver, e.g. the transmit part, is arranged to substantially filter out the first (i.e. downstream) signal. In some examples, the filtering is a low pass filtering. In some examples, the filtering 153 is a part of the splitting 152, e.g. by the three port filter.

In 154, the transmit part modulates the optical carrier from the OLT with the second signal. The same downstream optical carrier received from the OLT is reflected and used for upstream transmission back to the OLT. In some examples, the modulation, e.g. by modulator 68 also carries out the filtering of the downstream signal in 152.

The second signal has a frequency bandwidth which is entirely below the predetermined threshold, above which the first signal was transmitted and above the filtering cut-off by the ONT. As such, the second signal is in a second part of the RF spectrum which is separate to the first part of the first signal.

The method of generation of the second signal in the ONT 4 is now described.

In 155, a data signal is encoded, e.g. by LDPC encoder. In 156, the encoded signal is low pass filtered. The low pass filtered signal is used to modulate the received optical carrier in 153. As described, the low pass filter bandwidth may be less than the Nyquist frequency.

The encoding and filtering provides a spectrally compressed signal. The signal is a non-orthogonal signal. The transceiver is configured to introduce inter-symbol interference in the first signal and/or second signal as transmitted. This reduces the bandwidth occupied by the data, allowing both upstream and downstream signals to be contained within a relatively small RF bandwidth.

In 157, the optical carrier modulated by the second signal is transmitted from the ONT to the OLT. The signal transmitted is a spectrally compressed binary signal.

Figure 5:
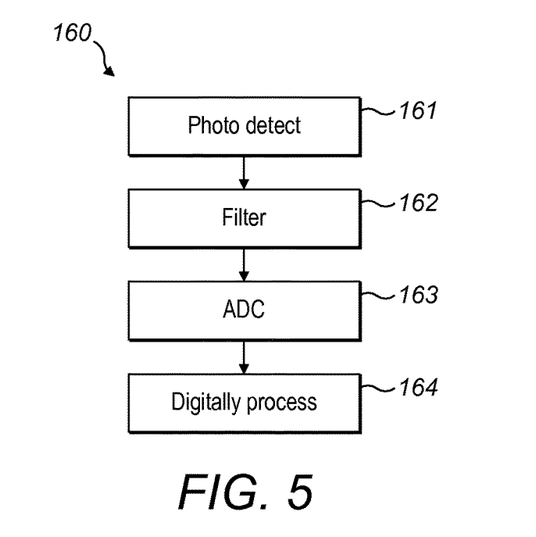
FIG. 5 shows a flowchart illustrating steps according to an example of a part of the invention.

FIG. 5 shows a method 160 in the receive part of the ONT. The receive part receives the optical carrier modulated with the first signal from the three port filter 61, as indicated by FIG. 4.

In 161, the received optical carrier modulated with the first signal is photodetected, e.g. by a photodiode. In 162, the detected first signal is filtered, e.g. low pass filtered.

In 163, the detected first signal is converted from an analogue signal to a digital signal, e.g. by ADC 74. In 164, the detected first signal is processed, e.g. by DSP 75.

Figure 6:
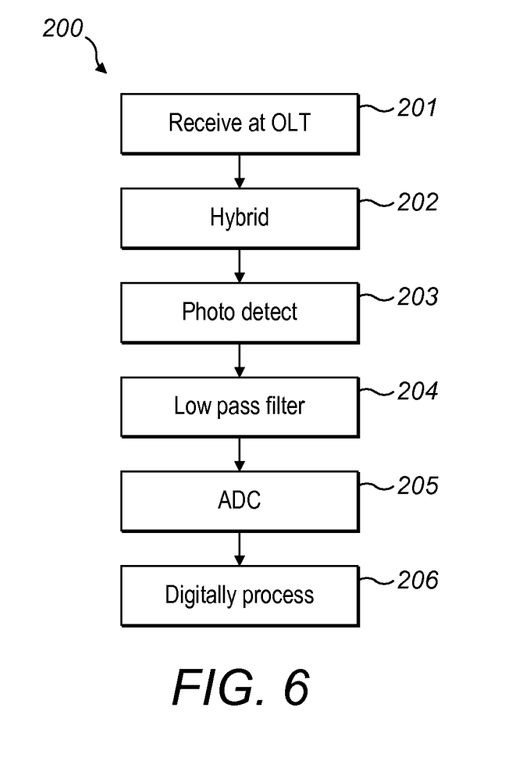
FIG. 6 shows a flowchart illustrating steps according to an example of a part of the invention.

FIG. 6 illustrates an example method 200 at the OLT according to one or more aspects of the invention. The method shown includes receiving steps at the OLT.

Aspects of the invention may relate to any subset of these steps.

In 201, an optical carrier modulated by the second signal is received at the OLT. The signal is received through the optical circulator.

In 202, the optical carrier modulated by the second signal is processed by a 90 degree hybrid device to separate two polarization states of the optical signal. In 203, each polarization is separately photodetected to carry out an optical to electrical conversion, e.g. by photodiode 31.

In 204, each polarization is separately low pass filtered. In 205, each polarization is converted from an analogue signal to a digital signal, e.g. by ADC 34. In 206, each polarization is processed, e.g. by DSP 35.

Aspects of the invention provide a spectrally efficient bidirectional transmission technique for an optical system. In some examples, the system is applicable in metro or access networks. The system is resilient to optical reflections. The system is realizable with low-cost optical components. The spectral compression (by including inter-symbol interference) and separation of upstream and downstream RF spectrums, particular for tolerant binary modulation formats, provides for an advantageous system. The transceiver is configured to introduce inter-symbol interference in the first signal and/or second signal as transmitted. In particular, the system is reflection-tolerant ad spectrally-efficient optical. The transmission may be used for metro-access systems, e.g. symmetric systems.

Aspects of the invention allow an increase in link distance and spectral efficiency (i.e. number of wavelengths). The invention is applicable to optical access and aggregation systems. Aspects of the invention allow use of low-cost equipment, in particular, at the remote terminal which is more cost-sensitive.

In some examples, the first and second signals have an equal bit-rate. In a further example, the bit rate of the first and second signals is not equal. In some examples, both first and second signals are spectrally compressed. In a further example, only one or neither of the first and second signals are spectrally compressed. Any alternative way of providing spectral compression (e.g. indicated by intentionally transmitting the signal with inter-symbol interference) may be used.

In some examples, the signal comprises one or more subcarriers. In some examples, there is one subcarrier for downstream, and one subcarrier for upstream. In some examples, the signal comprises a plurality of subcarriers which are subcarrier multiplexed (SCM). The subcarriers are separated by a RF frequency. In some examples, the upstream and/or downstream signal comprises a plurality of adjacent subcarriers.

Aspects of the present invention comprise a computer program or computer program product, configured to run on a transceiver, transceiver controller or transceiver processing unit, to carry out at least some of the functions described.

In an alternative example, the OLT transceiver is configured to detect the second signal by direct detection. The modulation formats, e.g. BPSK and OOK are examples only. Either BPSK or OOK may be used for the first or second signals. In some examples, any binary modulation format, low order modulation format, or high order modulation format may be used.

Any example of the invention may be combined with any other example of the invention. Aspects of the invention may be defined by any combination of features.

Abbreviations

AC Alternate Current
ADC Analog to Digital Converter
AM Amplitude Modulator
BPF Band Pass Filter
BPSK Binary Phase Shift Keying
CW Continuous Wave
DSP Digital Signal Processing
DWDM Dense Wavelength Division Multiplexing
EAM Electro Absorption Modulator
EO Electrical to Optical
LDPC Low Density Parity Check
LPF Low Pass Filter
MZM Mach Zehnder Modulator
OE Optical to Electrical
OLT Optical Line Terminal
ONT Optical Network Termination
OOK On Off Keying
PD Photo Diode
RSOA Reflective Semiconductor Optical Amplifier
SCM Sub Carrier Multiplexing
UDWDM Ultra Dense Wavelength Division Multiplexing
WDM Wavelength Division Multiplexing The invention may be defined in the claims by any combination of features described. Any aspect of any embodiment may be combined with any feature of any other embodiment.

The invention claimed is:

1. A transceiver, comprising:
   a receive part configured to receive and detect a first signal carried on an optical carrier, wherein the signal is in a first part of a RF spectrum;
   a modulator configured to modulate the same optical carrier with a second signal in a second part of the RF spectrum; and
   a transmit part configured to transmit the optical carrier modulated with the second signal, wherein the first part of the RF spectrum is separate to the second part of the RF spectrum,
   wherein an inter-symbol interference is introduced in the first signal and the second signal as transmitted to reduce bandwidths occupied by the first signal and the second signal, wherein the inter-symbol interference is recovered at the receive part, and
   wherein the first signal and/or the second signal is a spectrally compressed binary signal that comprises a maximum frequency of the higher frequency of the first signal and the second signal which is equal or lower than bit rates of the first signal and the second signal.

2. The transceiver as claimed in claim 1, wherein the spectrally compressed first and/or second signal has a bandwidth below a Nyquist frequency.

3. The transceiver as claimed in claim 1, wherein the transmit part is configured to filter out the first signal at the transceiver.

4. The transceiver as claimed in claim 1, wherein the modulator has a frequency response to modulate the second signal only in the second part of the RF spectrum.

5. The transceiver as claimed in claim 1, comprising a splitter configured to output the first signal to a receive part arranged to detect the first signal, and to output the received optical carrier to a transmit part.

6. The transceiver as claimed in claim 5, wherein the splitter is configured to filter out the first signal from the received optical carrier output to the transmit part.

7. A transceiver, comprising:
   a transmit part configured to transmit a first signal carried on an optical carrier, wherein the signal is in a first part of a RF spectrum; and a receive part configured to receive and detect a second signal carried on the same optical carrier in a second part of the RF spectrum, wherein the first part of the RF spectrum is separate to the second part of the RF spectrum, wherein an inter-symbol interference is introduced in the first signal and the second signal as transmitted to reduce bandwidths occupied by the first signal and the second signal, wherein the inter-symbol interference is recovered at the receive part, and wherein the first signal and/or the second signal is a spectrally compressed binary signal that comprises a maximum frequency of the higher frequency of the first signal and the second signal which is equal or lower than bit rates of the first signal and the second signal.

8. The transceiver as claimed in claim 7, wherein the transceiver is configured to detect the first signal by self-homodyne or direct detection.

9. The transceiver as claimed in claim 7, wherein the spectrally compressed first and/or second signal has a bandwidth below a Nyquist frequency.

10. The transceiver as claimed in claim 7, wherein the transmit part is configured to generate the first signal by mixing a radio frequency signal with a baseband modulated signal.

11. The transceiver as claimed in claim 7, wherein the receive part is configured to detect the second signal by self-homodyne or direct detection.

12. The transceiver as claimed in claim 7, comprising a low pass filter, wherein the low pass filter has a bandwidth lower than a Nyquist frequency.

13. A method in a transceiver, comprising:
receiving and detecting a first signal carried on an optical carrier, wherein the signal is in a first part of a RF spectrum;
modulating the same optical carrier with a second signal in a second part of the RF spectrum; and
transmitting the optical carrier modulated with the second signal, wherein the first part of the RF spectrum is separate to the second part of the RF spectrum,
wherein an inter-symbol interference is introduced in the first signal and the second signal as transmitted to reduce the bandwidths occupied by the first signal and the second signal, wherein the inter-symbol interference is recovered at the receive part, and
wherein the first signal and/or second signal is a spectrally compressed binary signal that comprises a maximum frequency of the higher frequency of the first signal and the second signal which is equal or lower than bit rates of the first signal and the second signal.

14. The method as claimed in claim 13, comprising spectrally compressing the first and/or second signal to a bandwidth below a Nyquist frequency.

15. The method as claimed in claim 13, further comprising filtering out the first signal at the transceiver.

16. The method as claimed in claim 13, comprising outputting the first signal to a receive part arranged to detect the first signal, and outputting the received optical carrier to a transmit part.

17. The method as claimed in claim 13, comprising filtering out the first signal from the received optical carrier output to the transmit part.

18. The method as claimed in claim 13, wherein the first signal is detected by direct detection.

19. A method in a transceiver, comprising:
transmitting a first signal carried on an optical carrier, wherein the signal is in a first part of a RF spectrum;
receiving and detecting a second signal carried on the same optical carrier in a second part of the RF spectrum, wherein the first part of the RF spectrum is separate to the second part of the RF spectrum,
wherein an inter-symbol interference is introduced in the first signal and the second signal as transmitted to reduce the bandwidths occupied by the first signal and the second signal, wherein the inter-symbol interference is recovered at the receive part, and
wherein the first signal and/or second signal is a spectrally compressed binary signal that comprises a maximum frequency of the higher frequency of the first signal and the second signal which is equal or lower than bit rates of the first signal and the second signal.

20. The method as claimed in claim 19, comprising spectrally compressing the first and/or second signal to a bandwidth below a Nyquist frequency.

21. The method as claimed in claim 19, wherein the first signal is generated by mixing a radio frequency signal with a baseband modulated signal.

22. The method as claimed in claim 19, wherein the detection is self-homodyne or direct-detection.

* * * * *